3,373,076
LAMINATION OF AMORPHOUS FLUOROCARBON POLYMER AND GLASS AND METHOD OF MAKING SAME
Rex B. Gosnell, San Diego, Calif., assignor to Whittaker Corporation, Los Angeles, Calif., a corporation of California
No Drawing. Filed Mar. 29, 1965, Ser. No. 443,682
13 Claims. (Cl. 161—189)

This invention relates to a novel transparent glass laminate having improved performance at elevated temperature.

Laminated glass having two sheets of thin glass with a sheet of nonbrittle plastic material between is well known. The glass used in the manufacture of laminated glass has the same physical properties as ordinary glass, so the benefits of lamination depend upon the ability of the plastic interlayer to hold the fragments caused by breaking of the glass itself. For laminated glass intended to be used only within the normal atmospheric temperature range, interlayers such as polyvinyl butyral and the silicones have been used.

However, the development of high speed ultrasonic aircraft has demonstrated that ordinary laminated glass is not completely suitable for windows in such vehicles because of the inability of the interlayer material to retain its strength and withstand the temperatures generated during flight.

According to the present invention there is provided a novel laminate which provides satisfactory performance up to temperatures of about 350° F.

It is an object of this invention to prepare a novel transparent glass laminate.

Another object of this invention is the provision of a glass laminate having improved performance up to temperatures of 350° F.

Yet another object of this invention is to provide a glass laminate having a significant tensile strength advantage over currently used laminate materials in the 100° F. to 350° F. temperature range.

These, as well as other objects of my invention, will become apparent from the more detailed description which follows.

The novel transparent glass laminate of this invention comprises a plurality of glass sheets separated by an interlayer of an amorphous high molecular weight chlorotrifluoroethylene - tetrafluoroethylene - vinylidene fluoride terpolymer consisting essentially of the following recurring units:

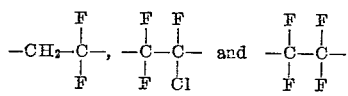

In general, terpolymer has a specific gravity of from about 1.8 to about 2.3. Typical of such a suitable terpolymer is Plaskon 3200 sold by the Allied Chemical Co. This material is further characterized by the following physical properties:

|  | Young's Modulus, p.s.i. | Percent Elongation |
|---|---|---|
| At 100° F | 510,000 | 0.9 |
| At room temperature | 156,000 | 198.5 |
| At 212° F | 2,860 | 520.0 |
| At 300° F | 1,600 | 805.0 |
| At 350° F | 2,400 | 320.0 |

While the nature of the bonding of the terpolymer to the glass is not fully understood, it has been found that this interlayer provides the excellent adhesion to the glass over a wide range of temperatures. The terpolymer is also substantially amorphous, i.e., contains little or no crystalline structure, and is highly transparent.

Preferably the glass sheets are coated with a conventional glass primer prior to lamination with the terpolymer interlayer. These primers are known to those skilled in the art. However, preferred glass primers are the aminoalkyl triethoxy silanes, such as aminopropyl triethoxy silane.

The use of the amorphous terpolymer as the interlayer material offers many advantages, particularly in the increased temperature limits of the laminate. The results obtainable according to this invention are quite surprising in view of the fact that other polyfluoro olefin polymers do not give satisfactory results.

It has been found that the amorphous terpolymer, as an interlayer material, compares favorably with the known commercially available interlayer materials such as the silicones and the polyvinyl butyrals. In fact, the terpolymer exhibits higher tensile properties within its usable range (−11° F. to +350° F.) than either the silicones or the butyrals.

The invention will be better understood by reference to the following specific example. It will be understood that the example is presented to illustrate the invention, not to limit it. In the example, the parts and the percentages are by weight unless otherwise indicated.

*Example I*

A sheet of glass was prepared by first dipping in 200° C. sulfuric acid, followed by a distilled water rinse and then dried. The glass surfaces were then primed in a conventional manner with 0.25% aminopropyl triethoxy silane in isopropanol. Two of the glass sheets are then laid up with the chlorotrifluoroethylene-vinylidene fluoride-tetrafluoroethylene terpolymer between the sheets of primed glass as the interlayer. The sandwich was then placed in the hot press at about 500 to 600° F. for five minutes at 250 to 300 pounds per square inch. The pressure was then released and the sandwich placed in a cold press at about 60 to 70° F. and a pressure of 250 to 300 pounds per square inch. When the part was cooled, it was removed from the press. The resultant laminate was transparent.

The adhesion of the interlayer to the glass in the laminate, prepared according to Example I was demonstrated by failing a specimen (0.10″ x 6.0″ x 6.0″ of terpolymer between two 0.10″ x 6.0″ x 6.0″ plates of glass) by a blow on the front and then turning the specimen over and failing the other side with a similar blow. The lack of shatter on the second blow indicated the excellent adhesion which had been attained. It was also found that one side of the laminate could be failed without failing the other side, indicating that the polymeric interlayer redistributed the stress.

Several tests were conducted on laminates containing amorphous chlorotrifluoroethylene-vinylidene fluoride-tetrafluoroethylene terpolymers as the interlayer. Five temperature-tensile tests were conducted on the amorphous terpolymer. These data were compared with similar tests performed on polyvinyl butyryl and silicone materials, as shown in the following table:

TABLE II

| Amorphous polymer at— | P.s.i. |
|---|---|
| 75° F. | 3,300 |
| 210° F. | 1,200 |
| 300° F. | 500 |
| 350° F. | 500 |
| Polyvinyl butyryl at— | |
| 75° F. | 4,500 |
| 210 F. | 0 |
| 300° F. | 0 |
| 350° F. | 0 |

TABLE II—Continued

Silicone at—
| | |
|---|---|
| 75° F. | 100 |
| 210° F. | 100 |
| 300° F. | 100 |
| 350° F. | 100 |

The foregoing data demonstrate the superiority of the interlayer material of the present invention over the temperature range corresponding roughly to a speed of mach 2.5 after 5 minutes of 50,000 feet altitude.

The terpolymer interlayer material has a tendency to crystallize when slow-cooled from certain elevated temperatures, thus affecting its transparency. This elevated critical temperature range is from about 414° F. to 360° F. Accordingly, in order to provide a layer of optimum transparency, the interlayer should be rapidly cooled through this range. This is accomplished by placing the heated laminate containing the novel polymer interlayer at a temperature of about 500 to 600° F. in a cold press at a temperature below about 100° F. and at elevated pressure. Preferably, the cold press is maintained at a temperature of about 60 to 70° F. at a pressure of from about 200 to about 400 p.s.i.

Many variations of the present invention will be apparent to those skilled in the art. Accordingly, it is intended that this invention be limited solely by the lawful scope of the appended claims.

I claim:

1. A novel glass laminate comprising at least two glass sheets separated by a plastic interlayer comprising an amorphous, high molecular weight chlorotrifluoroethylene, tetrafluoroethylene, vinylidene fluoride terpolymer.

2. A novel glass laminate prepared by placing a plastic layer comprising an amorphous, high molecular weight chlorotrifluoorethylene, tetrafluoroethylene, vinylidene fluoride terpolymer between glass sheets, subjecting the sandwich to elevated temperature and pressure and thereafter quickly cooling the resultant laminate.

3. A novel glass laminate prepared by placing a plastic layer comprising an amorphous high molecular weight chlorotrifluoroethylene, tetrafluoroethylene, vinylidene fluoride terpolymer between glass sheets, heating the sandwich to a temperature of about 500 to 600° F. at a pressure of from about 200 to 400 p.s.i., and thereafter quickly cooling the resultant laminate.

4. A novel glass laminate prepared by placing a plastic layer comprising an amorphous high molecular weight chlorotrifluoroethylene, tetrafluoroethylene, vinylidene fluoride terpolymer between glass sheets, heating the sandwich to a temperature of about 500 to 600° F. at a pressure of from about 200 to 400 p.s.i., and thereafter quickly cooling the resultant laminate to a temperature below about 360° F.

5. The novel glass laminate of claim 1, wherein the glass sheets are coated with a primer.

6. The novel glass laminate of claim 1, wherein the glass sheets are coated with an aminoalkyl triethoxy silane primer.

7. The novel glass laminate of claim 1, wherein the glass sheets are coated with an aminopropyl triethoxy silane primer.

8. The process of preparing a novel glass laminate which comprises placing a plastic layer comprising an amorphous, high molecular weight chlorotrifluoroethylene, tetrafluoroethylene, vinylidene fluoride terpolymer between glass sheets, subjecting the sandwich to elevated temperature and pressure, and thereafter quickly cooling the resultant laminate.

9. The process of preparing a novel glass laminate which comprises placing a plastic layer comprising an amorphous high molecular weight chlorotrifluoroethylene, tetrafluoroethylene, vinylidene fluoride terpolymer between glass sheets, heating the sandwich to a temperature of about 500 to 600° F. at a pressure of from about 200 to 400 p.s.i., and thereafter quickly cooling the resultant laminate.

10. The process of preparing a novel glass laminate which comprises placing a plastic layer comprising an amorphous high molecular weight chlorotrifluoroethylene, tetrafluoroethylene, vinylidene fluoride terpolymer between glass sheets, heating the sandwich to a temperature of about 500 to 600° F. at a pressure of from about 200 to 400 p.s.i., and thereafter quickly cooling the resultant laminate to a temperature below about 360° F.

11. The process of claim 8, wherein the glass sheets are coated with a primer.

12. The process of claim 8, wherein the glass sheets are coated with an aminoalkyl triethoxy silane primer.

13. The process of claim 8, wherein the glass sheets are coated with an aminopropyl triethoxy silane primer.

References Cited

UNITED STATES PATENTS

| | | | |
|---|---|---|---|
| 2,774,702 | 12/1956 | Smith | 161—189 |
| 2,778,758 | 1/1957 | Henning | 161—193 X |
| 2,968,649 | 1/1961 | Pailthorp | 161—89 X |
| 3,027,274 | 3/1962 | Huntington | 161—193 X |
| 3,297,186 | 1/1967 | Wells | 161—193 |
| 3,325,344 | 6/1967 | Semancik et al. | 161—254 X |

EARL M. BERGERT, Primary Examiner.

HAROLD ANSHER, Examiner.